US012741435B2

(12) United States Patent
Smith et al.

(10) Patent No.: US 12,741,435 B2
(45) Date of Patent: Sep. 22, 2026

(54) OIL-BEARING MATERIAL EXTRACTION DEVICE AND SYSTEM

(71) Applicant: MSM MILLING PTY LTD, Manidra (AU)

(72) Inventors: Peter Mac Smith, Manildra (AU); Marcio Novaes, Lisburn (GB)

(73) Assignee: MSM MILLING PTY LTD, Manidra (AU)

( * ) Notice: Subject to any disclaimer, the term of this patent is extended or adjusted under 35 U.S.C. 154(b) by 318 days.

(21) Appl. No.: 18/258,708

(22) PCT Filed: Jan. 18, 2022

(86) PCT No.: PCT/AU2022/050019
§ 371 (c)(1),
(2) Date: Jun. 21, 2023

(87) PCT Pub. No.: WO2022/150883
PCT Pub. Date: Jul. 21, 2022

(65) Prior Publication Data
US 2024/0042718 A1 Feb. 8, 2024

(30) Foreign Application Priority Data
Jan. 18, 2021 (AU) ................................ 2021900094

(51) Int. Cl.
*B30B 9/16* (2006.01)
*B30B 9/12* (2006.01)
*B30B 9/26* (2006.01)

(52) U.S. Cl.
CPC ................ *B30B 9/16* (2013.01); *B30B 9/121* (2013.01); *B30B 9/127* (2013.01); *B30B 9/26* (2013.01); *B30B 9/125* (2013.01)

(58) Field of Classification Search
CPC ................................. B30B 9/12; B30B 9/121
See application file for complete search history.

(56) References Cited

U.S. PATENT DOCUMENTS 4,401,023 A * 8/1983 Suhr ......................... B30B 9/12 100/150
5,333,556 A * 8/1994 Isobe ........................ B30B 9/26 366/147
(Continued)

FOREIGN PATENT DOCUMENTS

CN 204322589 U 5/2015
CN 107877923 A 4/2018
(Continued)

OTHER PUBLICATIONS

Pachka Wade, M.A. et al., 'A Review on Design and Analysis of Oil Expeller Spares', International Journal of Research in Advent Technology, vol. I, Issue 5, Dec. 2013, pp. 290 to 296. p. 292, last paragraph (below figure 2).
(Continued)

*Primary Examiner* — Matthew Katcoff
(74) *Attorney, Agent, or Firm* — Berg Hill Greenleaf Ruscitti LLP

(57) ABSTRACT

A commercial-scale oil-bearing material expeller press having an oil-bearing material inlet, an oil-bearing material press cake outlet and an oil outlet in a temperature-controlled barrel; said barrel housing a compression screw; said compression screw having a central shaft and a plurality of continuous or discontinuous screw flights wherein there are one or more compression zones along the direction of travel of said oil-bearing materials from said oil-bearing material inlet to said oil-bearing material outlet, wherein said central shaft increases in diameter in said direction of travel; and wherein at least said barrel is adapted to be cooled in a plurality of cooling zones.

7 Claims, 9 Drawing Sheets

(56) References Cited

U.S. PATENT DOCUMENTS

| | | | | | |
|---|---|---|---|---|---|
| 5,351,612 | A | * | 10/1994 | Kemper | B30B 9/26 100/129 |
| 2010/0203222 | A1 | | 8/2010 | Dechao | |

FOREIGN PATENT DOCUMENTS

| | | | |
|---|---|---|---|
| DE | 4109229 | A1 | 9/1992 |
| WO | 2015/150433 | A1 | 10/2015 |
| WO | 2018/160056 | A2 | 9/2018 |

OTHER PUBLICATIONS

International Search Report and Written Opinion received in International Application PCT/AU2022/050019, filed on Jan. 18, 2022, mailed on Mar. 22, 2022, 10 pages.

* cited by examiner

OIL-BEARING MATERIAL EXTRACTION DEVICE AND SYSTEM

CROSS REFERENCE TO RELATED APPLICATION

This application is a national stage application under 35 U.S.C. 371 of PCT Application No. PCT/AU2022/050019 having an international filing date of Jan. 18, 2022, which designated the United States, which PCT application claimed the benefit of Australian Application Serial No. 2021900094, filed Jan. 18, 2021, both of which are incorporated by reference in their entirety.

TECHNICAL FIELD

The invention relates to the field of commercial oil extraction methods from oil bearing plant material, including: soy, canola (rapeseed) sunflower seed, linseed (flaxseed), peanut, copra, palm fruit and seeds, cotton seed, wheat bran and pollard and safflower seed, and the manufacture of equipment for that purpose. In particular, the invention relates to an improved plant oil extraction method and a device therefor.

BACKGROUND OF THE INVENTION

Vegetable oils are used in a variety of ways, including primarily in food products, as potential renewable fuel sources and more recently in relation to the manufacture of bioplastics.

Such oils can be extracted from the oil-bearing material using mechanical presses (often referred to as expellers), chemical processes, or a combination of both. The chemical process (solvent extraction) is highly efficient but capital-intensive and it is also under significant regulatory pressure in several markets due to environmental and sustainability concerns, due to the use of flammable chemical solvents. Solvent extraction is used in operations that process many tons of oil-bearing material per hour, while mechanical presses have typically been used for processing oil-bearing materials in the order of kilograms per hour up to several thousands of tonnes per day.

Mechanical presses are substantially less efficient in terms of oil extraction when compared to solvent extraction and, as a result, a higher percentage of the vegetable oil is left in the press cake (the solid residue after the pressing process).

Solvent extraction results in a press cake having about 1% residual oil, but typical residual oil content in the press cake from modern commercial presses is between 8% and 12%. The residual oil represents a financial loss to an oil-bearing material processer as it normally does not fully recover the monetary value of the press cake (typically used as animal feed). Therefore, increasing the efficiency of a mechanical press can increase the profitability of a small- to medium-size vegetable oil extraction operation.

Mechanical presses for the recovery of oil from oil bearing material, otherwise known as expellers, are typically used for recovering vegetable oils in two ways;

a) as a full pressing, i.e. a high-pressure operation leading to maximum oil recovery and consequently low residual oil in the press-cake; or b) as a pre-press operation prior to solvent extraction.

In a pre-press operation, the press operates at a relatively low pressure in order to produce a press-cake with high porosity to facilitate the solvent percolation during the follow up solvent extraction. Therefore, maximum oil extraction is not the main goal of a pre-press operation. In a pre-press operation, the press-cake leaves the press with a residual oil content of about 18-20% by weight.

However, in the full press operation, the aim is to extract the maximum amount of the available oil in the oil-bearing material. Therefore, in the full press operation, the press operates at a relatively high pressure in order to produce a press-cake with the minimum amount of residual oil therein.

A typical press generally comprises a screw rotatably mounted within a cylindrical press barrel. The press is typically divided into three sections, namely a feed section, one or more compression sections, and a discharge section.

The feed section is at the beginning or feed end of the screw and incorporates an opening in the wall of the press barrel into which oil-bearing material can be gravity fed on demand, or in some cases, under pressure by an auxiliary feed screw (force fed presses). In the feed section, the screw auger transports the oil-bearing material towards the compression section.

In the compression section the screw auger is shaped to compress and break up the cell walls of the oil-bearing material to extract the oil therefrom. The press barrel includes a draining area where the oil can flow out of the press barrel via oil outlet channels formed in the side wall thereof. In such prior art presses, the draining area is typically along the full length of the press barrel.

The discharge section includes a press cake outlet and is commonly defined by a press die mounted on, or integrally formed within the discharge end of the press barrel. The press die comprises narrowing tapered inner walls having a relatively narrow outlet opening at an end thereof, through which the press cake is extruded.

During operation of the press, a column or tube of compressed press cake is formed in the discharge section of the press, while new oil-bearing material is fed into the compression section by the action of the screw auger in the feed section. New cake is constantly formed at the inner end of the discharge section as the pressed cake is constantly discharged through the outlet opening of the discharge section. The operation may proceed continuously by a constant addition of oil-bearing material at the feed section.

The shape of the screw auger has to be designed in a way to be able to cause a higher volume displacement at the feed section compared to the volume displacement at the discharge section, such that the material is compressed as it is conveyed down the press barrel.

The oil-bearing material is subject to increasing axial and radial pressure as it is conveyed from the feed section to the discharge section and the resulting pressure causes the oil to be expelled from the oil-bearing material cells. The expelled oil exits the press barrel via the oil outlet channels in the draining area adjacent the discharge end of the press barrel.

Various attempts to improve the oil recovery efficiency of mechanical presses have been made in the past by academic researchers and by the press manufacturers themselves. Most of the developments have been concentrated in the design of the press screw.

Attempts to improve the press efficiency have been made by changing the screw configuration (single stage, double stage, mixing piece, humped distance piece worm design, etc.) or by adding an extra counter rotating screw (twin-screw presses).

In WIPO patent document no. WO2015/150433 (University of Ulster) there is disclosed a pilot-scale oil expeller press that can carry out a method of oil extraction that involves controlling the temperature of the compression section of the press in order to maintain the temperature of the oil-bearing materials below the glass transition temperature of the material.

The glass-liquid transition, or glass transition, is the gradual and reversible transition in amorphous materials (or in amorphous regions within semicrystalline materials) from a hard and relatively brittle "glassy" state into a viscous or rubbery state as the temperature is increased. An amorphous solid that exhibits a glass transition is called a glass. The reverse transition, achieved by supercooling a viscous liquid into the glass state, is called vitrification.

The glass-transition temperature ($T_g$) of a material characterizes the range of temperatures over which this glass transition occurs. It is always lower than the melting temperature, $T_m$, of the crystalline state of the material, if one exists.

Despite the change in the physical properties of a material through its glass transition, the transition is not considered a phase transition; rather it is a phenomenon extending over a range of temperature and defined by one of several conventions. Such conventions include a constant cooling rate (20° K per minute) and a viscosity threshold of 1012 Pa·s, among others. Upon cooling or heating through this glass-transition range, a material also exhibits a smooth step in the thermal-expansion coefficient and in the specific heat, with the location of these effects again being dependent on the composition of the material.

In order to operate the method of WO2015/150433, it is therefore necessary to know the $T_g$ of any given oil-bearing material, which is not always readily available.

In addition, the oil expeller press disclosed in WO2015/150433 is a small-scale device and is not suited to the commercial-scale processing of oil-bearing materials.

Accordingly, it is an object of the invention to provide a method of extracting oil from oil-bearing materials at a commercial scale, and a press capable of performing said method, that ameliorates at least some of the problems associated with the prior art, particularly with reference to the residual oil content of the press-cake.

SUMMARY OF THE INVENTION

Broadly the invention can be understood to reside in a novel configuration of the barrel and screw for a commercial oil press, allowing several cooling patterns of at least the barrel, the screw and the choke zone, that can process oil-bearing material materials into oil and press cake in a single pass at temperatures not exceeding 70° C. and at a wide range of output rates from several kg/hour up to greater than 5 tonnes/hr.

In particular embodiments, the invention allows the independent control of the temperature of at least the barrel, the screw and the choke zone which, surprisingly results in the obtention of a press-cake having residual oil content significantly lower than current state of the art presses.

According to a first aspect of the invention, there is provided a commercial-scale press for extracting oil from oil-bearing material; said press having an oil-bearing material inlet, and oil-bearing material outlet and an oil outlet; said press having a temperature-controlled barrel; said barrel housing a compression screw; said compression screw having a central rotating shaft having a plurality of continuous or discontinuous screw flights; wherein there are one or more compression zones in said barrel along the direction of travel of said oil-bearing materials from said oil-bearing material inlet to said oil-bearing material outlet; wherein said central shaft increases in diameter in said direction of travel thereby to produce said compression zones; and wherein said barrel is adapted to be cooled in a plurality of cooling zones; wherein at least some of said cooling zones and said compression zones are collocated.

Such a press can be adapted to process at commercial levels of between several kilogram/hr of oil-bearing material and up to more than 15 tonnes/hr of oil-bearing material. Also, these modifications can be retrofitted to existing commercial scale oil presses, rather requiring entirely new presses to be made or purchased.

The cooling of the pressed press cake in the press also means that it is not necessary to pre-cool the oil-bearing material before the pressing operation, which may reduce overall operating costs.

Preferably, further said cooling zones are located at all compression zone(s), and also at a choke zone adjacent the press cake outlet, and inside the central shaft.

Preferably, said press is adapted to receive oil-bearing materials via said oil-bearing material inlet and wherein said oil-bearing materials are then conveyed by said compression screw into a first cooled compression zone; then a decompression zone wherein the diameter of the compression screw shaft is smaller than the end of the diameter of the first cooled compression zone; then through a second cooled compression zone; then to a further compression zone or choke zone located at the press cake outlet.

Having the above-described cooling zones allows for more optimal control of the operation of the press as the temperature at the discharge zone can be set higher than the temperature in the compression zone or shaft cooling, thereby to soften the spent oil-bearing material press cake in order to aid discharge without needing to reduce cooling or pressure in the compression zones.

Having said compression zones as described above results in lower counter-current oil flows in each location, allowing for greater tolerance and greater oil extraction.

Preferably, the oil outlet is adapted to collect oil from the entire length of the barrel. Therefore, the press can have larger drainage sections to allow greater oil removal. These are typically located along the length of the screw, between the cooled sections where the cooling jacket is located around the compression and discharge sections.

Preferably, the flights of said compression screw have angled oil-bearing material engagement faces that are angled at between 120° and 135° from the centreline of the shaft, where 0° would represent the centreline of the shaft in the direction of travel of the oil-bearing material, and more preferably angled at between 125° and 130° from the centreline of the shaft. This creates radial pressure, not just horizontal pressure, that keeps the press lining bars/cage clean helping with oil drainage and better oil extraction with pressure being exerted on the oil-bearing materials in more than one direction.

Without wishing to be bound by any particular theory of operation, it is speculated that the invention creates simultaneously an intense mixing of extracted material which allows more contact with the screw and the barrel and better control of its temperature.

Preferably, the internal diameter of the barrel in said compression zones may be 5 mm to 10 mm less than in said decompression zones. The diameter of the screw liner or cage may vary in different locations along the length of the shaft, allowing for a greater pressure differential between the feed/decompression zones and the compression zones ensuring a more complete counter current oil flow.

According to another aspect of the invention, there is provided a method of extracting oil from oil-bearing materials on a commercial scale, said method including the step of pressing said oil bearing material in a press according to any described above.

According to another aspect of the invention, there is provided a method of extracting oil from oil-bearing materials on a commercial scale, said method including the steps of: feeding oil-bearing materials into an oil-bearing material expeller press inlet; subjecting said oil-bearing material to simultaneous compression and cooling a first time; removing said compression and cooling; subjecting said oil-bearing materials to simultaneous compression and cooling a second time; and then said oil-bearing materials exit said oil-bearing material expeller press.

According to another aspect of the invention, there is provided oil that has been extracted from oil-bearing materials using any method described above.

Now will be described, by way of a specific, non-limiting example, a preferred embodiment of the invention with reference to the drawings.

DETAILED DESCRIPTION OF THE INVENTION

Figure 1A:
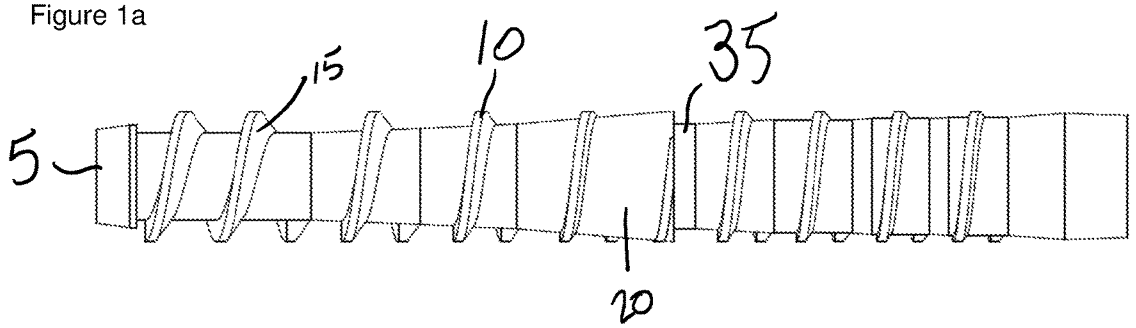
FIG. 1*a* shows a compression screw for an oil-bearing material expeller press according to the invention.

Broadly, the invention can be understood to reside in a novel configuration of the surrounding barrel and the compression screw for a commercial oil-bearing material expeller press that can process oil-bearing materials into oil and press cake in a single pass at temperatures not exceeding 70° C. and over a wide range of outputs, including outputs significantly greater than those of the prior art.

When processed through an oil-bearing material expeller press according to the invention, the residual oil content in the post-processed press cake (an indication of the efficiency of oil extraction in the process) e.g., for rapeseed (canola) residual oil contents are typically between 4-12% of dry matter basis, but more typically between 6-8%, after a single pass through a screw press on whole rapeseed with an initial oil content of between 38-48% and a moisture content of between 4-12%.

By contrast, prior art cold pressing technology achieves a result of between 12-16% oil in cake (OIC) on a comparable throughput, see table 1.

TABLE 1

| Technique | OIC | Throughput* |
|---|---|---|
| Cold pressing | 12-16% | 30-40% |
| Shaft cooling | 11-15% | 30-40% |
| Shaft & jacket cooling | 9-11% | 35-45% |
| Shaft. Jacket & choke cooling | 6-9% | 35-45% |
| Shaft, jacket, choke cooling and angular flights | 5-8% | 65-85% |

*Throughput is expressed as a percentage of the press manufacturer's rated full press capacity for preconditioned feed material.

The invention includes a system for cooling the press to control the viscosity of the oil-bearing material via a combination of cooling points that are utilised concurrently, or independently, to optimise press performance in terms of oil extraction efficiency and press throughput.

The cooling methods cover three areas of the press: shaft cooling; choke cooling and compression or jacket cooling. Compression cooling may be employed at one or more locations along the screw press shaft depending on the press size, length capacity and the oil-bearing material being processed.

Each cooling zone needs individual temperature control to optimise press performance in terms of oil yield and maintenance of protein quality in the residual fibre/carbohydrate/protein press cake.

The flights on the compression screw may be segmented or continuous.

The screw may preferably contain knife/nib bars to aid in the throughput of the material along the press.

The diameter of the cage surrounding the screw may be of a constant diameter or it may be variable in order to aid press performance. Typically, the sections of cage containing lining bars or rings near the feed end or immediately following a hump or compression zone may be tapered to ensure the internal pressure inside the cage during operation is lowest in these zones to aid the "hydraulic pumping" of the oil from the areas of high compression to the drainage zones.

The press screw worm piece/s is/are designed in such a way that the pressure gradient from the feed end or following a compression section is constantly increasing to enhance the hydraulic pumping of the oil from the high compression/hump zones back to the low-pressure zone for ease of oil drainage.

Figure 1B:
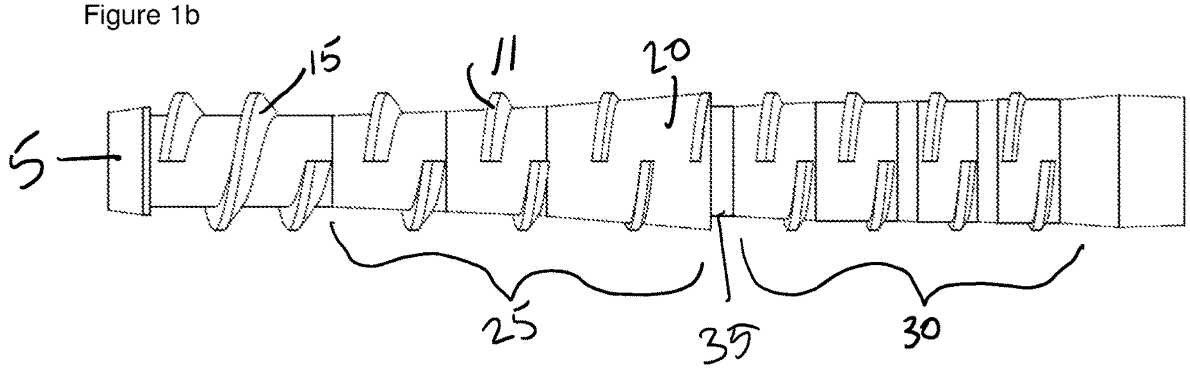
FIG. 1*b* shows an alternative configuration of a compression screw for an oil-bearing material expeller press according to the invention.

Turning to FIGS. 1*a* and 1*b*, there is shown a compression screw 5 according to the invention. FIG. 1*a* shows a continuous flight 10. FIG. 1*b* shows a series of discontinuous flights 11. The pitch and diameter of the flight segments suitable for the desired capacity of the press or the oil-bearing material being processed will be selectable by those familiar with the construction and design of screw presses.

The screw 5 may be made from a single piece of steel or a shaft with individual replacement flights placed over the main shaft.

An important feature of the flights (10, 11) is the geometry of the angular face 15 of the leading face of the screw flights (10, 11), i.e., the face that engages the oil-bearing material to force it along. The 'leading' face, rather than having a profile that is the standard 90° to the centreline of the shaft, will according to a preferred embodiment of the invention have an angle of between 120-135° to the centre line in the direction of travel and more preferably in the range of 125-130° to the centre line in the direction of travel where 0° would represent the centreline of the shaft in the direction of travel of the oil-bearing material.

Figure 9:
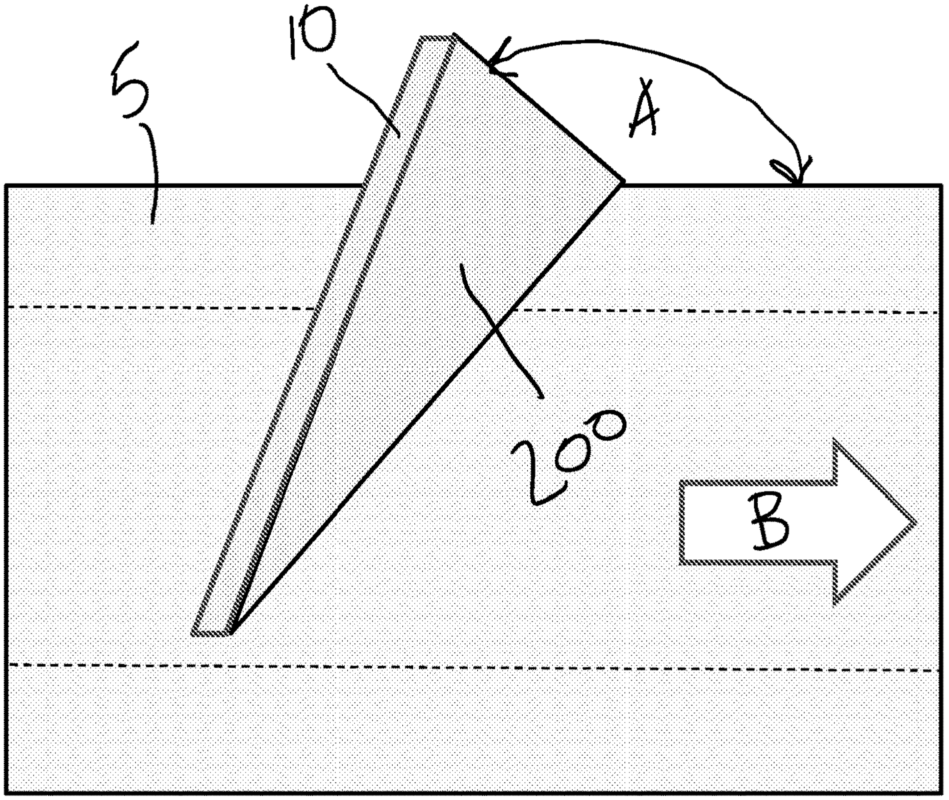
FIG. 9 is a schematic diagram of a part of a compression screw for an oil-bearing material expeller press according to the invention.

This is further illustrated in detail in FIG. 9, where the leading face 200 of the flight 10 makes an angle A with the surface of the shaft 5 (and indeed with the centreline of the shaft, which is depicted parallel with the shaft surface), as the material is moved in the direction of arrow B.

It will also be observed that the diameter of the screw shaft 20 increases in diameter in the direction of travel in two sections (25, 30), in order to increase pressure, then release pressure as the press cake passes out of section 25 at point 35, and then is compressed again in section 30.

Figure 2A:
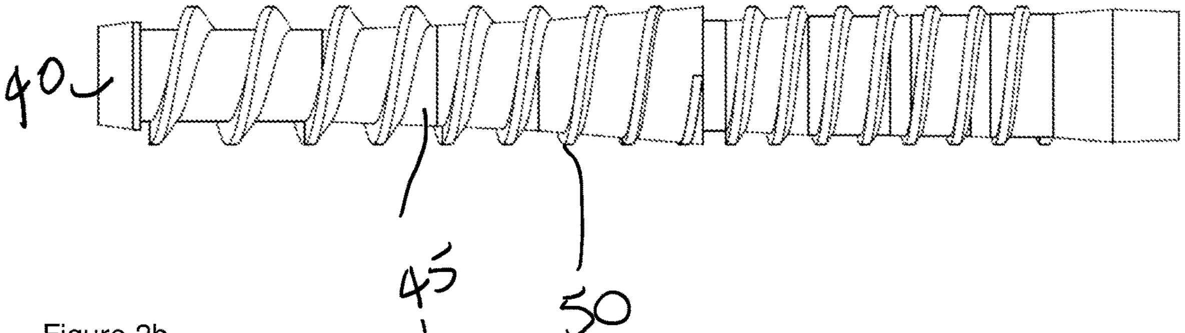
FIG. 2*a* shows an alternative configuration of a compression screw for an oil-bearing material expeller press according to the invention.
Figure 2B:
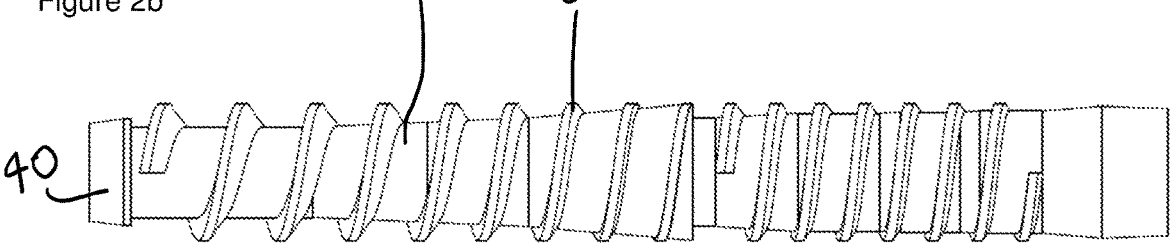
FIG. 2*b* shows an alternative configuration of a compression screw for an oil-bearing material expeller press according to the invention.

FIGS. 2*a* and 2*b* show a compression screw 40 with a similar shaft 45 but with a series of continuous flights 50.

Figure 3A:
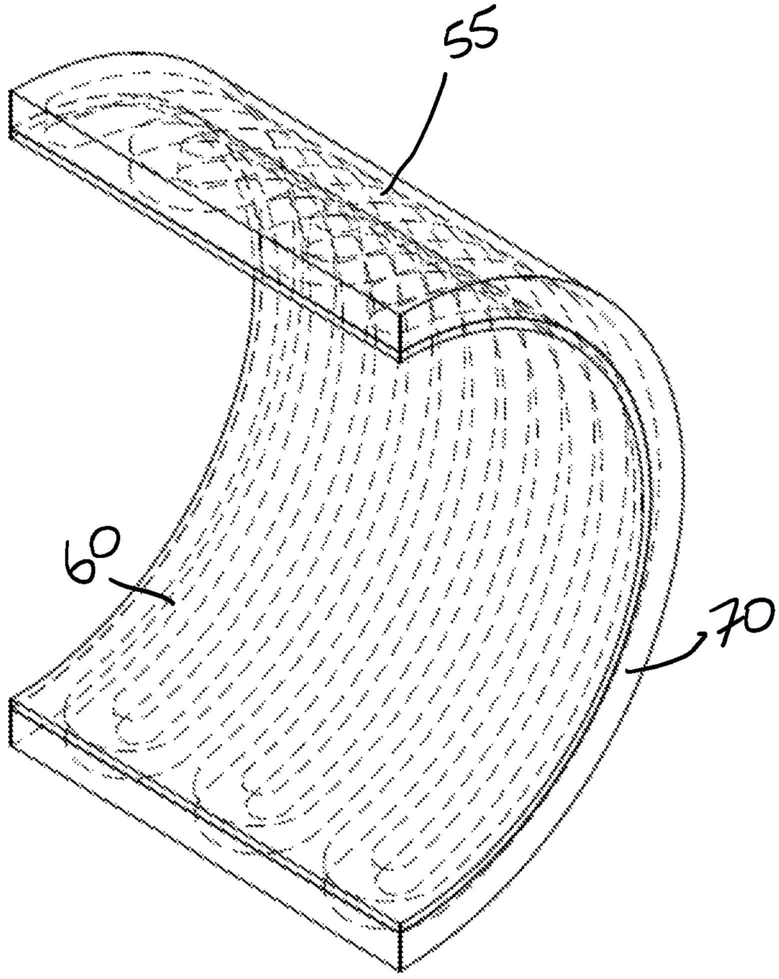
FIG. 3*a* shows an assembled segment of a cooling element for an oil-bearing material expeller press according to the invention.
Figure 3B:
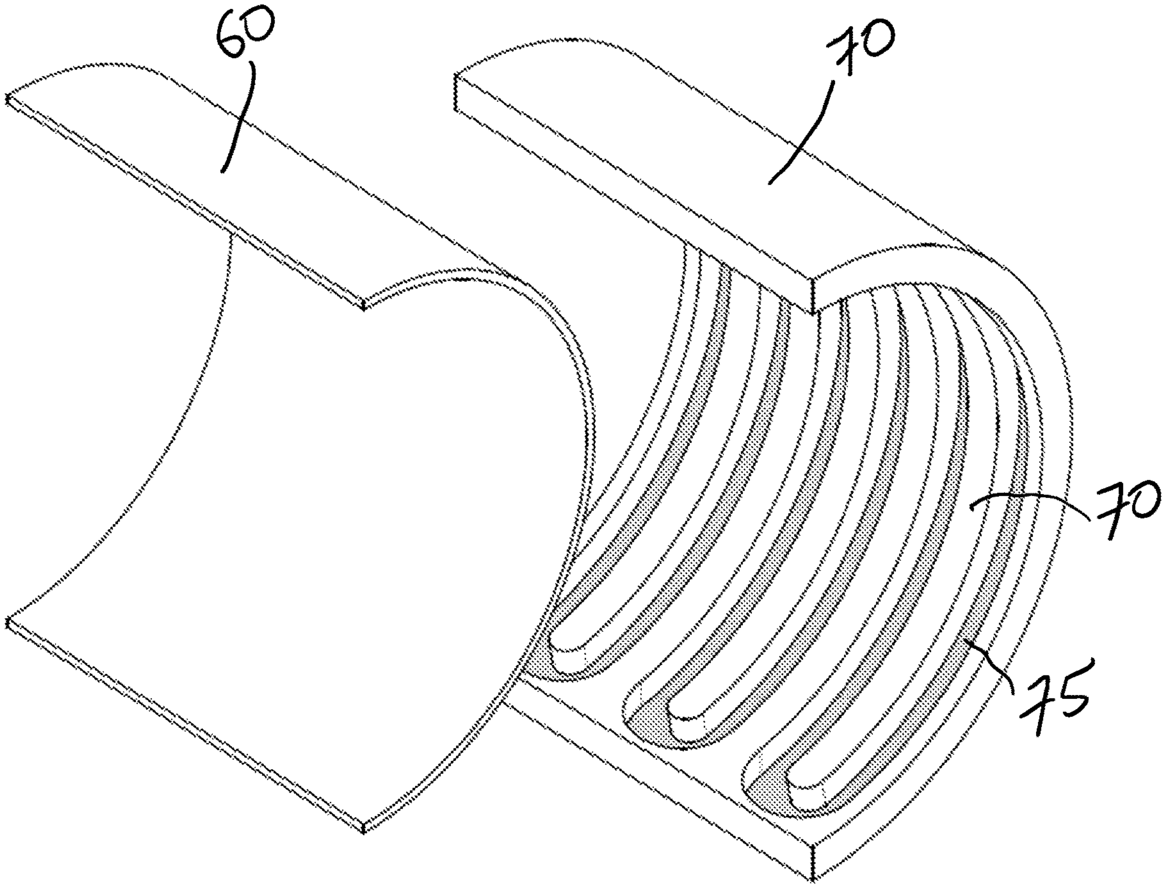
FIG. 3*b* is an exploded view of a cooling element for an oil-bearing material expeller press according to the invention.

FIGS. 3*a* and 3*b* show assembled and exploded views of a segment of a cooling jacket 55 adapted to fit inside the barrel of the screw press according to the invention.

Two matching cooling jackets 55 are placed around the shaft inside the barrel cage and are positioned to: maintain the desired cooled temperature along the process; create a cooler zone to increase oil-bearing material viscosity and therefore oil extraction; and to allow a higher operating pressure in the compression zone as the cooling jackets prevent 'foots' (small pieces of press cake) from escaping from the press, which would allow pressure to be reduced in the compression zone.

The cooling jacket can have many suitable types of construction and those familiar with the design and construction of cooling membranes or jackets will be able to construct a suitable cooling jacket. The jacket is best placed in a location in the press relative to the compression zone of the screw and is useful for its ability to remove heat from the oil-bearing material that is caused by the friction and pressure the pressing process creates inside the barrel.

It is envisaged that the cooling jacket may incorporate a wear plate 60 made of suitable material in contact with the oil-bearing material to give good heat transfer properties to remove thermal energy (heat) from the oil-bearing material and high resistance to wear.

It is envisaged the body of the cooling jacket 65 will be made of a material that provides sufficient strength to resist the forces produced by the process and will be able to conduct the thermal energy away from the wear plate via 'fins/ribs' 70 in its construction efficiently via a thermal fluid that passes though the channel 75 formed by said ribs.

The temperature that the thermal fluid operates at is determined by several factors: the design of the screw and the friction it creates and hence the amount of thermal energy required to be removed; the type of oil-bearing material being processed and the fibre/carbohydrate to oil ratio in the material being pressed. The temperature will need to be adjusted based on the moisture content of the oil-bearing material (the higher the moisture content of the oil-bearing material the lower the operating temperature is required for efficient oil extraction).

The temperature of the cooling fluid required tends to be inversely related to the moisture content of the oil-bearing material being processed.

For example, in the case of canola/rapeseed, the operating range of the cooling fluid is from 0-50° C. when the seed moisture content of the seed is between 4-12%. When the moisture content of the seed is within the range of 5-10%, the thermal fluid operating temperature should be in the range of 15-35° C.

Figure 4A:
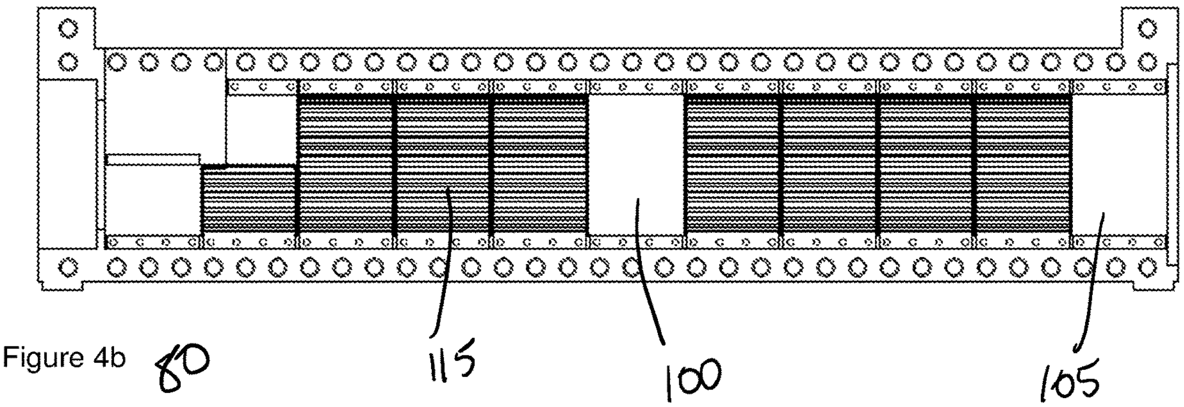
FIG. 4 shows internal views of a barrel cage for an oil-bearing material expeller press according to the invention.
Figure 4B:
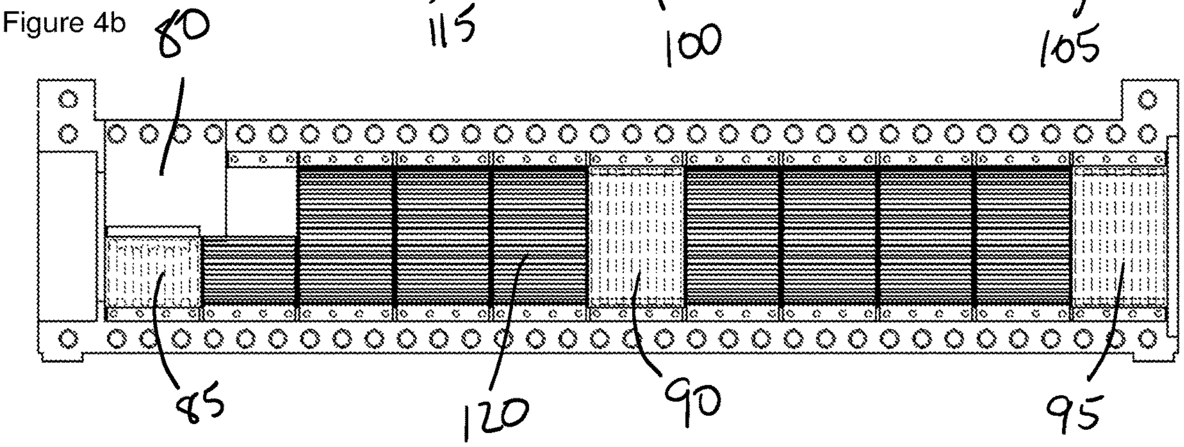
Figure 5A:
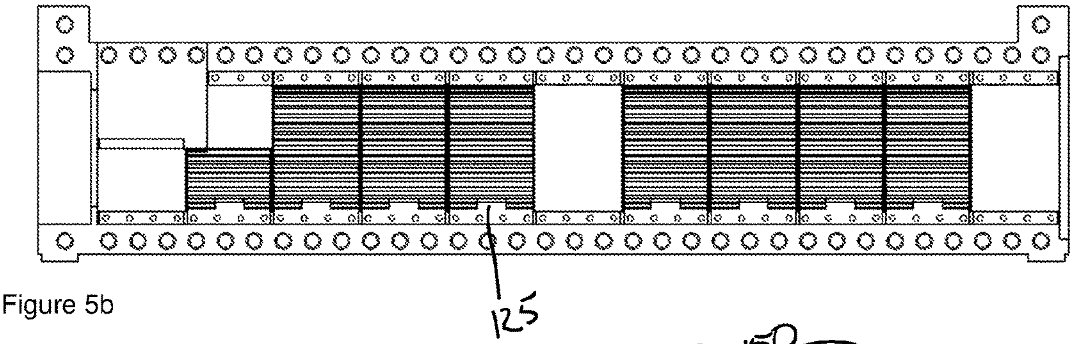
FIG. 5 shows internal views of an alternative barrel cage for an oil-bearing material expeller press according to the invention.
Figure 5B:
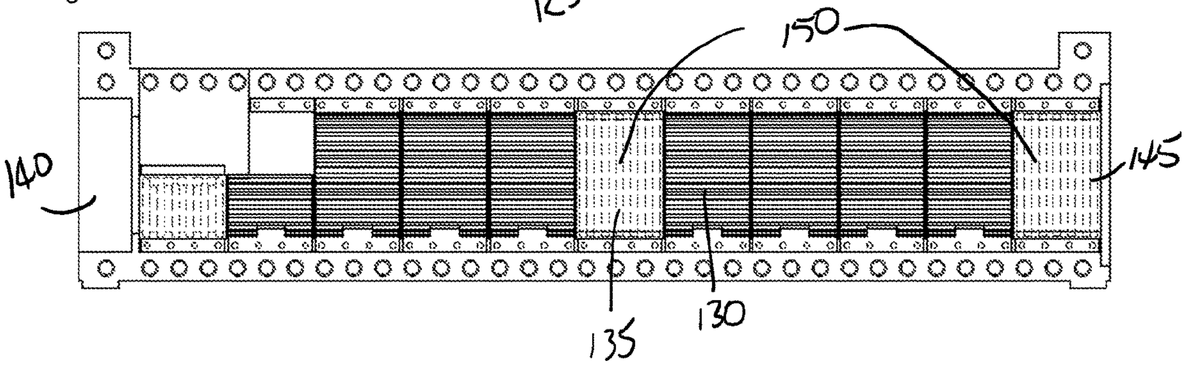

Turning to FIGS. 4 & 5, there is shown internal detail of the inner walls of the screw press barrel. The oil-bearing material feed point 80 is shown.

In FIG. 4, the location of the cooling jacket around the shaft is shown (85, 90, 95) at this location serves several purposes.

It allows for greater pressure to be maintained as pieces of oil-bearing material (also known as 'foots') cannot be squeezed out, as they normally would, through the normal lining bar gaps/shims at this point, as it coincides with the location of the higher pressure zones on the shaft (as per point 35 in FIG. 1*a*).

It allows the oil-bearing material to be cooled at this point, increasing the viscosity of the material, resulting in higher pressure, thereby resulting in better oil yields; and it allows the process to keep the temperature of the press cake <70° C. to reduce heat damage to the amino acids that make up the protein of the press cake. This results in higher availability of protein in the residual press cake due to less heat damage. Thus, this localised cooling is another advantage of the invention.

The design of the screw is such that the cross-sectional volume of the screw at any point along the shaft from the oil-bearing material fed into the press to the end of the compression section is reduced as it moves along the shaft by several factors: an increase in the diameter of the boss of the shaft; and/or a change in the pitch of the flights. For example, in screws with a plurality of compression zones there may be incorporated sudden local increases in volume created by several factors such as decreased shaft boss and increased flight pitch.

For those familiar with the design, manufacture and operation of screw presses, it will be understood that these changes are used to create an increase in pressure along the shaft, allowing for: deaeration of the gaps between the oil-bearing material; reduction of operating volume to allow for the concomitant volume reduction that occurs along the shaft due to the oil extraction (and the loss of some 'foots' through the lining bars).

Figure 8:
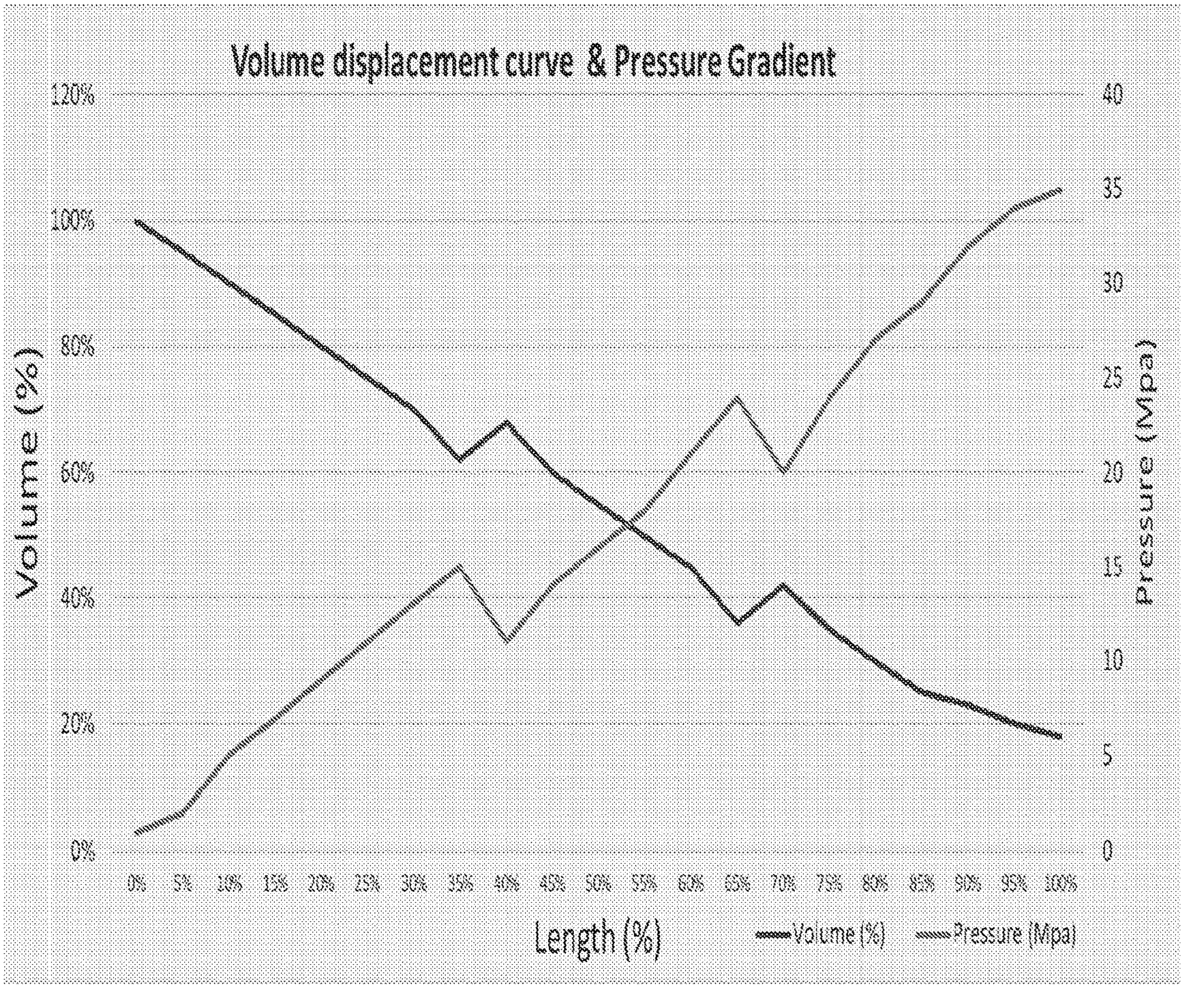
FIG. 8 is a graph showing the pressure in the barrel of an oil-bearing material expeller press according to the invention.

In the present invention, the press is designed such that the compression/pressure 'curve', shown in FIG. 8, from the feed end or from the point immediately following a compression zone to the next compression zone, is constantly increasing from the feed end to the discharge end or in the case with several cooling zones, to the next compression zone, so that extracted oil can flow back towards the area of low pressure on a pressure gradient from the top right hand corner of the graph to the lower left. The x-axis in FIG. 8 indicates the length along the shaft from the point of low pressure (feed end, or immediately after the hump) and the y-axis represents the pressure at that point.

In effect, the increases in compression/pressure along the shaft means the oil released in the high compression zones of the press is hydraulically 'pumped' back towards the feed end, counter-current to the direction of the oil-bearing material being pressed so that it can drain from the press in a low-pressure zone.

To facilitate this 'hydraulic' pumping of the oil in some cases of the invention the first field of lining bars or rings and the fields immediately after a hump/compression zone, may be of a larger diameter and then taper inwards to meet the diameter of the next field towards the discharge end. This creates a low-pressure zone towards which the oil released from the oil-bearing material under higher pressure is pumped/pushed hydraulically.

FIG. 4 shows a typical layout of a press barrel cage that may be used with the invention. Those familiar with the design and construction of a screw press will have suitable designs, in terms of strength and practicality, to design a cage suitable for holding the lining bars, rings and cooling jackets for the invention.

There is shown a typical lining bar 115 layout, however this can be replaced with rings or lining bars of different length or thickness. Those familiar with screw press operation will be able to fit suitable sized shims between the lining bars to allow for the drainage of oil.

Typically, the shim settings are wider at the feed end 80 of the press and reduce in thickness as the material moves towards either a compression zone 100 or discharge end 105 of the press. Immediately after a compression zone there will generally be an increase in shim thickness before shim thickness reduction begins again as the material moves towards the discharge end of the press.

The location of the two cooling jackets (90, 95) within the press are shown. In alternative embodiments the press may incorporate 1, 2 or more cooling jackets depending on the length of the shaft, the diameter of the shaft and the volume of material being pressed. The lining bars 120 are also represented. Note this cage does not have 'knife bars' and is therefore typically used in conjunction with a continuous screw flight as per FIG. 2*a*.

FIG. 5 shows a cage suitable for a segmented flight as such as that shown in FIG. 1*a*. Shown are knife bars 125 which are placed in the cage to be fixed between the screw segments to help the material being pressed move forward rather than rotate in a stationary position. The nibs on the knife bars are usually of a suitable designed hardened material.

FIG. 5 shows a typical cage design familiar to those who have skill in designing and building cages for screw presses.

A feature of this cage is that the field of lining bars or rings 130 immediately following a cooling jacket/section 135, are tapered from the feed end 140 towards the discharge end 145. That is, the diameter of the cage is larger at the discharge end immediately following the cooling section and then tapers back to be the same diameter as most of the cage lining bars/rings after a distance of between 15-50 cm, or more typically 20-40 cm. In this figure, the location of the cooling jackets 150 and the tapered lining bars 130 are an example only, as they may be located anywhere along the shaft depending on the type of oil-bearing material being processed.

Figure 6:
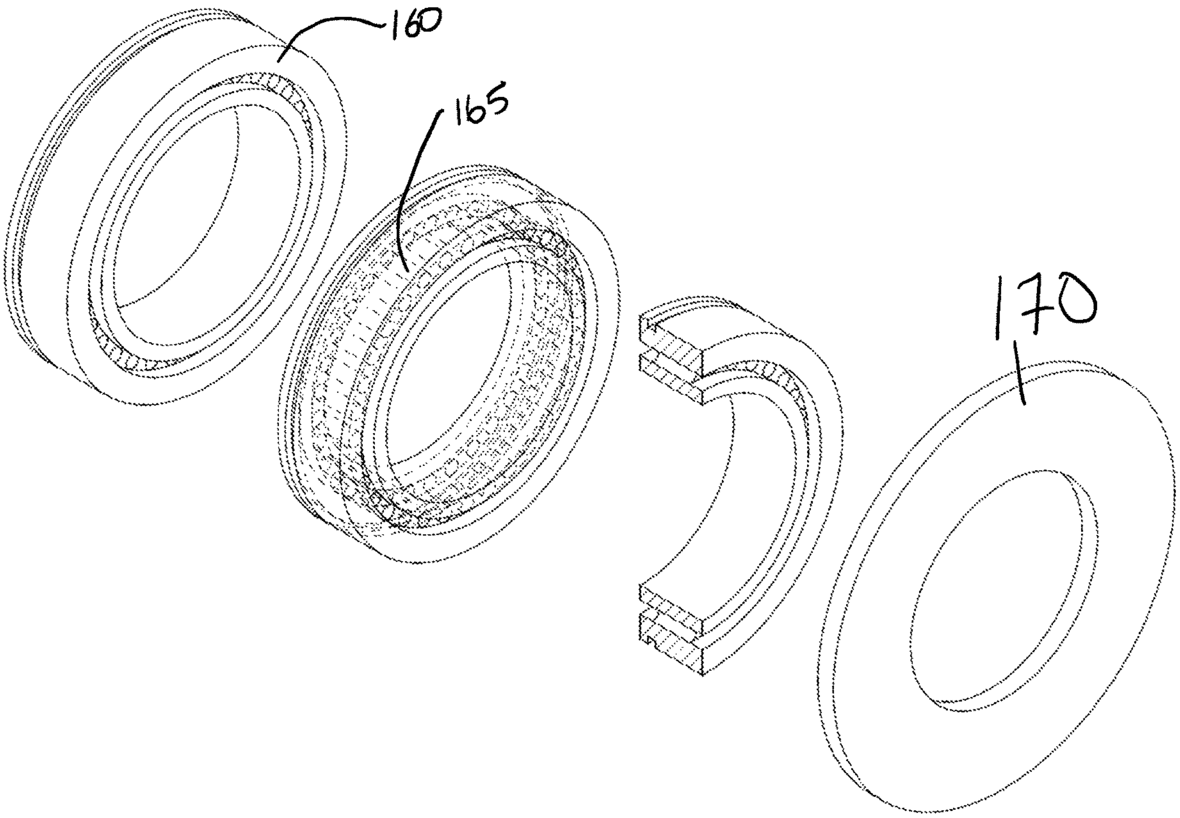
FIG. 6 shows exploded and assembled views of a choke piece for an oil-bearing material expeller press according to the invention.

FIG. 6 shows a choke piece or ring 160 of the screw press. It is a single or multi-piece ring that fits over or around the shaft at the final compression zone before the press exit. This is the location of the highest pressure point within the press and cooling the choke, 160 at specific temperatures relative to the oil-bearing material, moisture level, oil content and fibre content allows the operator to optimise press performance in terms of oil yield and operating temperature and throughput.

The choke piece 160 will utilise cooling techniques familiar with other parts of the inventive process and they are intended to maximise the ability of the choke piece to remove thermal energy from the material in this zone of the press. The example depicted in FIG. 6 displays a labyrinth-type cooling configuration where a cooling medium passes through galleries 165 in the choke ring from front to rear.

Any choke ring design employed must be capable of withstanding the operating pressures within the zone and maximise the heat/energy removal from the oil-bearing material being processed. As per the figure, a cover plate 170 would be used on both sides of the choke to hold the cooling medium in place and to allow servicing of the choke.

Figure 7:
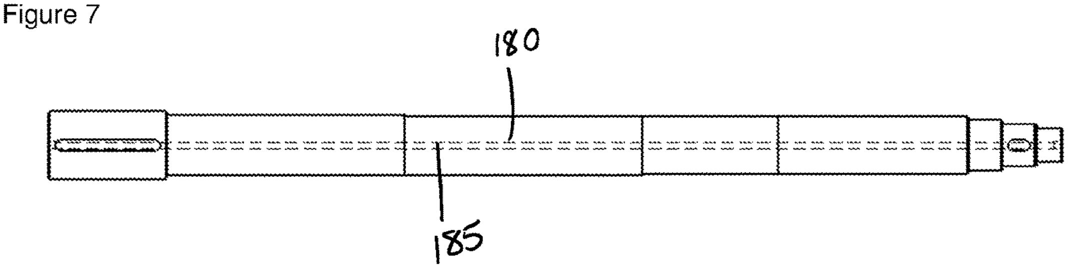
FIG. 7 shows a cooled shaft for an oil-bearing material expeller press according to the invention.

FIG. 7 shows a cooled shaft 180. Those skilled in the art of screw press manufacture and operation will be familiar with shaft cooling. In this invention it is one of the three cooling processes that are performed together for optimal operation of the invention.

The shaft may have the screw flights fabricated into it or it may have the screw pieces as a whole or in segments attached to it, usually by placing the pieces onto the keyed shaft with matching keyways in the screw flights.

There has been a coolant channel 185 centrally bored through the centre of the shaft. Depending on the design of the screw press, the cooling fluid can be fed from the feed or discharge ends of the shaft, or in certain cases passed through the complete length of the press. In either method the cooling fluid is fed and removed from the shaft via a suitably designed rotary union.

The example shown is of a keyed, stepped shaft although other methods for attaching worm pieces to the shaft will be familiar to those skilled in the art.

The shaft must remain sufficiently strong after boring of the coolant channel to withstand the forces involved in pressing the oil-bearing material.

In the case of the thermal fluid being only fed and extracted from the same end of the shaft, a suitable fluid rotary union is usually employed for the fluid to be pumped into and extracted from the shaft. Typically, the fluid is fed in from the discharge end of the shaft either through the inside or outside of a pipe that feeds the thermal fluid a suitable distance down the shaft prior before the liquid exits the shaft via the opposite pathway.

The volume of thermal fluid used should be maximised without compromising the structural integrity of the shaft, in order to maximise thermal energy removal from the shaft.

In operation the oil-bearing material expeller press according to the invention provides a method for increasing oil yield and producing a press cake of higher quality from non-pre-heated oil-bearing materials by maintaining press cake temperatures below 70° C. during processing.

The process involves a single press, as described above, processing (pressing) cleaned oil bearing material that typically has not been cooked/conditioned.

Whole oil-bearing material is feed into the inlet end of the press which may include several sets of lining bars and one or more blank sections of barrel located along the screw, typically at the highest-pressure points compression zones with or without cooling.

The press may be started with no cooling (ambient) to allow residual material to be conveyed (pushed) through the press. A press may need to be heated with warmer thermal fluid though the cooling zones, prior to operation to 'soften' hard material inside the press to allow initial operation.

Once the press is feeding continuously, cooling fluid is introduced to the cooling jackets to increase the viscosity of the oil-bearing material/cake. Cooling temperature is a function of oil-bearing material moisture and is an inverse relationship between moisture content and temperature as discussed above.

The press should be operated so that the press cake temperature does not exceed 70° C., ideally not exceeding 60° C., and within the range of 30-70° C. or more preferably within the range of 50-65° C.

Ideally the press should be operated with the press cake at the choke section as close as possible to its glass transition temperature, but this would be close to the maximum operating pressure and this could lead to the press stopping operation due to excessive pressure caused by excessive increase in the viscosity of the press cake.

Therefore, the temperature at the press choke should ideally be maintained just above the cake glass transition temperature in order to maintain a trouble-free operation.

The process involves controlling the temperature of the press relative to the moisture content of the oil-bearing material being pressed. The higher the oil-bearing material moisture content, the lower the press operating temperature and vice versa. The relationship between the required optimum temperature, (at or just above the glass transition temperature of the press cake), is inversely related to the oil-bearing material moisture content to maximise oil extraction.

The glass transition temperature ($T_g$) is the temperature range where an amorphous polymer (or a biopolymer, such as canola press cake), transitions from a hard, glassy material to a soft, rubbery and ductile material.

A method should be employed for determining pressure inside the press. It may include using amps and torque readings as a proxy for pressure or pressure sensors placed at suitable locations.

Typically, the operating temperature range is between 60° C. to −20° C. with a moisture content range of 0-15%. Typically, the change in operating temperature of the cake at the choke of the press will vary between 5-10° C. for every 1% change in moisture content of the oil-bearing material.

In the compression zones and choke sections of the press the temperature should be such that it does not substantially exceed the glass transition temperature of the material (crushed oil-bearing material/press cake).

The choke section of the screw assembly and parts adjacent to it are designed in such a way that the increase in pressure that occurs through operating the press at or just above the glass transition temperature is not lost through the choke orifice but rather acts as a plug to hold the pressure within the barrel to maximise oil extraction.

The design of the choke is a factor of the diameter of the shaft, barrel, screw design and required throughput of the press.

The process according to the invention can achieve residual oil contents in the press cake with single pressing of between 4-12% (typically 5-7%); and throughputs of approx. 50% to 80% of a full expeller pressing. Refer Table 1.

In table 2 below are shown typical process conditions for the operation of an oil-bearing material expeller press according to the invention carrying out the method according to the invention.

TABLE 2

Typical Process Conditions

| | Oil in Seed % | Moisture in Seed % | Press Speed RPM | Julabo Set Point | Cooling Set Point | Through-put Kg/hr | OIC % | MI Cake % | Choke Inlet ° C. | Jacket Inlet ° C. | Shaft Inlet ° C. | Comments |
|---|---|---|---|---|---|---|---|---|---|---|---|---|
| Auger | 40.70% | 6.60% | 35.00 | 20.00 | N/A | 90.69 | 9.10% | 10.70% | 18.20 | 11.10 | 11.10 | Total Cooling |
| Assembly 5 | 40.10% | 6.50% | 37.00 | 20.00 | N/A | 90.12 | 9.00% | 10.70% | 18.80 | 13.00 | 13.00 | |
| Seeds at 6.7% | 40.10% | 6.50% | 40.00 | 20.00 | N/A | 96.15 | 9.50% | 10.50% | 18.90 | 13.80 | 13.70 | |
| | 40.60% | 6.50% | 40.00 | 20.00 | N/A | 92.8 | 9.50% | 10.40% | 19.20 | 15.50 | 15.70 | |
| | 40.60% | 6.50% | 40.00 | 20.00 | N/A | 95.9 | 9.70% | 10.50% | 19.00 | 15.90 | 17.50 | |
| Auger | 40.40% | 6.80% | 20.00 | N/A | N/A | 64.64 | 10.30% | 10.30% | | | | No Cooling |
| Assembly 5 | 40.80% | 6.60% | 25.00 | N/A | N/A | 76.5 | 11.70% | 10.00% | | | | |
| Seeds at 6.5% | 40.50% | 6.70% | 30.00 | N/A | N/A | 91.2 | 11.40% | 10.10% | | | | |
| | 40.10% | 6.60% | 30.00 | N/A | N/A | 92.4 | 13.60% | 9.60% | | | | |
| | 39.80% | 6.60% | 30.00 | N/A | N/A | 92.3 | 12.80% | 9.60% | | | | |
| | 39.80% | 6.40% | 30.00 | N/A | N/A | 93.6 | 12.90% | 9.40% | | | | |
| Auger | 41.20% | 6.60% | 20.00 | 20.00 | N/A | 55 | 6.80% | 11.20% | 19.80 | 0.00 | 12.30 | Total Cooling |
| Assembly 5 | 41.30% | 6.70% | 20.00 | 20.00 | N/A | 43.9 | 6.20% | 11.30% | 19.80 | 13.90 | 13.90 | |
| Seeds at 6.7% | 41.90% | 6.90% | 40.00 | 20.00 | N/A | 100.4 | 7.90% | 11.00% | 20.10 | 16.20 | 16.50 | |
| | 40.90% | 6.90% | 40.00 | 20.00 | N/A | 103.0 | 8.00% | 10.80% | 17.50 | 17.50 | 17.80 | |
| | 41.50% | 6.60% | 40.00 | N/A | N/A | 119.3 | 12.30% | 0.00% | 0.00 | 0.00 | 0.00 | No Cooling |
| Auger | 40.90% | 7.50% | 20.00 | 20.00 | N/A | 49.45 | 6.70% | 11.90% | 19.70 | 0.00 | 14.30 | Shaft & Choke |
| Assembly 5 | 40.90% | 7.50% | 20.00 | 20.00 | N/A | 51.28 | 6.90% | 12.00% | 20.10 | 0.00 | 15.40 | Cooling only |
| Seeds at 7.5% | 39.90% | 7.80% | 40.00 | 20.00 | N/A | 102.82 | 7.50% | 11.80% | 20.80 | 18.30 | 18.10 | Total Cooling |
| | 40.40% | 7.80% | 40.00 | 20.00 | N/A | 96 | 7.40% | 11.80% | 20.90 | 19.50 | 19.50 | |
| | 40.40% | 7.80% | 50.00 | 20.00 | N/A | 109.46 | 7.60% | 11.80% | 21.80 | 20.40 | 20.40 | |
| | 40.40% | 7.80% | 50.00 | 20.00 | N/A | 105.42 | 7.40% | 11.60% | 21.90 | 20.40 | 20.70 | |
| Auger | 40.20% | 7.40% | 30.00 | N/A | N/A | 103.61 | 12.00% | 11.10% | 0.00 | 0.00 | 0.00 | Endogenous |
| Assembly 5 | 40.00% | 7.50% | 30.00 | N/A | N/A | 103.58 | 10.30% | 11.00% | 0.00 | 0.00 | 0.00 | Heat |
| Seeds at 7.5% | 39.70% | 7.60% | 30.00 | N/A | N/A | 103.14 | 10.90% | 11.00% | 0.00 | 0.00 | 0.00 | |
| Auger | 39.90% | 7.50% | 35.00 | 20.00 | N/A | 91.05 | 8.10% | 11.20% | 6.20 | 6.20 | 6.00 | Total Cooling |
| Assembly 5 | 38.30% | 7.70% | 35.00 | 20.00 | N/A | 94.94 | 7.80% | 11.40% | 8.00 | 8.00 | 7.70 | |
| Seeds at 7.5% | 39.90% | 7.50% | 40.00 | 20.00 | N/A | 87.7 | 7.60% | 11.30% | 12.40 | 12.40 | 12.00 | |
| Auger | 41.30% | 7.50% | 30.00 | N/A | N/A | 102.17 | 12.30% | 11.20% | | | | No Cooling |
| Assembly 5 | 41.20% | 7.50% | 30.00 | N/A | N/A | 102.57 | 12.30% | 11.40% | | | | |
| Seeds at 7.5% | 41.10% | 7.60% | 30.00 | N/A | N/A | 104.3 | 11.90% | 11.30% | | | | |
| | 40.90% | 7.50% | 30.00 | N/A | N/A | 106.0 | 12.30% | 11.30% | | | | |
| Auger | 42.00% | 7.40% | 35.00 | 20.00 | N/A | 95.69 | 8.10% | 11.70% | 19.00 | 10.10 | 9.60 | Total Cooling |
| Assembly 5 | 42.00% | 7.40% | 40.00 | 20.00 | N/A | 107.85 | 8.60% | 11.70% | 20.60 | 13.20 | 12.40 | |
| Seeds at 7.5% | 41.10% | 7.50% | 40.00 | 20.00 | N/A | 109.18 | 8.40% | 11.60% | 20.00 | 15.10 | 14.70 | |
| | 41.40% | 7.50% | 40.00 | 20.00 | N/A | 104.7 | 8.20% | 11.70% | 19.80 | 17.30 | 17.10 | |

TABLE 2-continued

Typical Process Conditions

| | Oil in Seed % | Moisture in Seed % | Press Speed RPM | Julabo Set Point | Cooling Set Point | Through-put Kg/hr | OIC % | MI Cake % | Choke Inlet ° C. | Jacket Inlet ° C. | Shaft Inlet ° C. | Comments |
|---|---|---|---|---|---|---|---|---|---|---|---|---|
| Auger | 39.60% | 8.50% | 20.00 | 10.00 | N/A | 65.38 | 7.80% | 12.80% | 10.30 | 8.20 | 8.10 | Total Cooling |
| Assembly 5 | 39.60% | 8.60% | 20.00 | 10.00 | N/A | 66.14 | 8.10% | 12.70% | 11.20 | 10.20 | 9.90 | |
| Seeds at 8.5% | 39.10% | 8.90% | 20.00 | 10.00 | N/A | 44.74 | 5.90% | 12.60% | 11.70 | 11.90 | 11.50 | |
| | 38.80% | 8.90% | 20.00 | 20.00 | N/A | 19.12 | 5.60% | 13.10% | 12.00 | 13.40 | 12.90 | |
| | 38.80% | 8.90% | 20.00 | 20.00 | N/A | 63.4 | 6.30% | 12.60% | 20.70 | 0.00 | 14.40 | |
| | 38.80% | 8.80% | 20.00 | 20.00 | N/A | 23.68 | 5.60% | 13.07% | 20.20 | 0.00 | 15.10 | |
| | 38.00% | 9.00% | 20.00 | 20.00 | N/A | 15.53 | 6.30% | 0.00% | 20.70 | 0.00 | 16.10 | |
| Auger | 40.10% | 8.40% | 40.00 | 20.00 | N/A | 94.86 | 7.30% | 12.70% | 20.20 | 13.90 | 13.50 | |
| Assembly 5 | 40.30% | 8.50% | 40.00 | 20.00 | N/A | 98.15 | 7.30% | 12.60% | 20.70 | 15.60 | 15.30 | |
| Seeds at 8.5% | 40.10% | 8.40% | 40.00 | 20.00 | N/A | 93.9 | 7.00% | 12.50% | 20.80 | 17.80 | 17.60 | |
| | 38.60% | 8.90% | 20.00 | N/A | N/A | 69.96 | 11.20% | 11.90% | 0.00 | 0.00 | 0.00 | Endogenous Heat |
| | 39.10% | 8.50% | 40.00 | N/A | N/A | 134 | 10.70% | 11.40% | 0.00 | 0.00 | 0.00 | Endogenous Heat |

It will be appreciated by those skilled in the art that the above-described embodiment is merely one example of how the inventive concept can be implemented. It will be understood that other embodiments may be conceived that, while differing in their detail, nevertheless fall within the same inventive concept and represent the same invention.

The invention claimed is:

1. A commercial-scale expeller press for extracting oil from oil-bearing material; said expeller press comprising:

an oil-bearing material inlet, an oil-bearing material outlet and an oil outlet; said expeller press having a temperature-controlled barrel; said barrel housing a compression screw; said compression screw having a central rotating shaft having a plurality of continuous or discontinuous screw flights; wherein there are one or more compression zones in said barrel along the direction of travel of said oil-bearing materials from said oil-bearing material inlet to said oil-bearing material outlet; wherein said central shaft increases in diameter in said direction of travel thereby to produce said compression zones; and wherein said barrel has an internal cage and internal linings and said linings and/or cage that are adapted to be cooled in a plurality of cooling zones; and wherein at least some of said cooling zones and said compression zones are collocated; wherein at least one of said cooling zones is located at the final compression zone before the oil-bearing material press cake outlet; and wherein said cooling zone incorporates an internally cooled choke ring.

2. The expeller press of claim 1, wherein the central shaft incorporates internal coolant flow.

3. The oil-bearing material expeller press of claim 1, wherein the flights of said compression screw have oil-bearing material engagement faces that are angled at between 120° and 135° from the centreline of the shaft, where 0° would represent the centreline of the shaft in the direction of travel of the oil-bearing material.

4. The oil-bearing material expeller press of claim 3, wherein the flights of said compression screw have oil-bearing material faces that are angled at between 125° and 130° from the centreline of the shaft, where 0° would represent the centreline of the shaft in the direction of travel of the oil-bearing material.

5. The oil-bearing material expeller press of claim 1 wherein at least one of said cooling zones is located adjacent to said oil outlet.

6. The oil-bearing material expeller press of claim 1, wherein said press is adapted to receive oil-bearing materials via said oil-bearing material inlet and wherein said oil-bearing materials are then conveyed by said compression screw into a first cooled compression zone; then a decompression zone wherein the diameter of the compression screw shaft is smaller than the end of the diameter of the first cooled compression zone; then through a second cooled compression zone; then to a cooled oil-bearing material outlet.

7. The oil-bearing material expeller press of claim 1, wherein the internal diameter of the barrel in said compression zones is 1 mm to 20 mm less than in said drainage zones.

* * * * *